Feb. 16, 1943. J. W. PAGE 2,311,463
BUCKET TOOTH
Filed Dec. 12, 1941 3 Sheets-Sheet 1
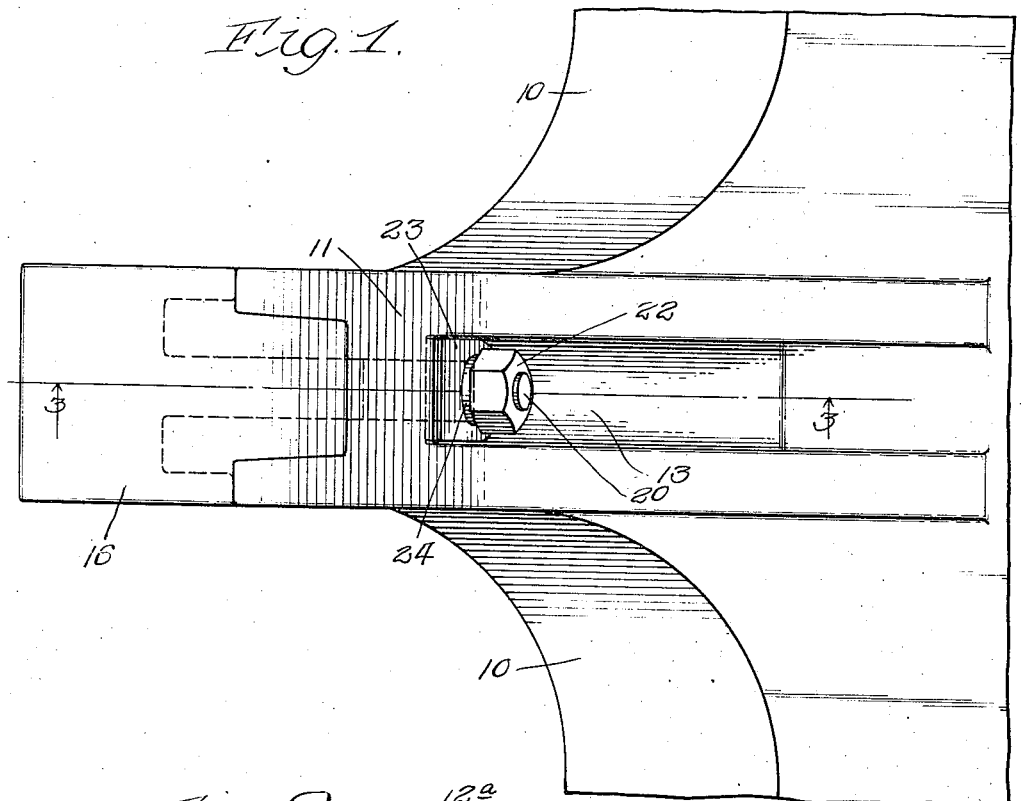
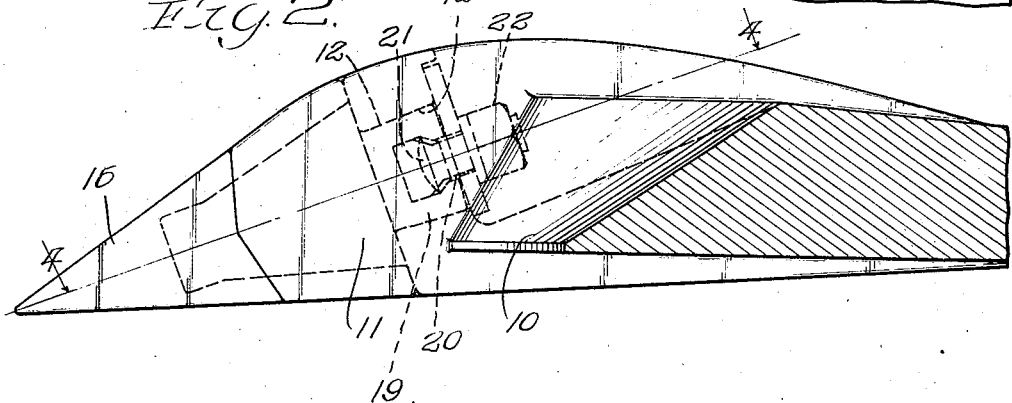
Inventor:
John W. Page,
By Christen, Niles, Davies & Hirschl
Attys.

Feb. 16, 1943.   J. W. PAGE   2,311,463
BUCKET TOOTH
Filed Dec. 12, 1941   3 Sheets-Sheet 2
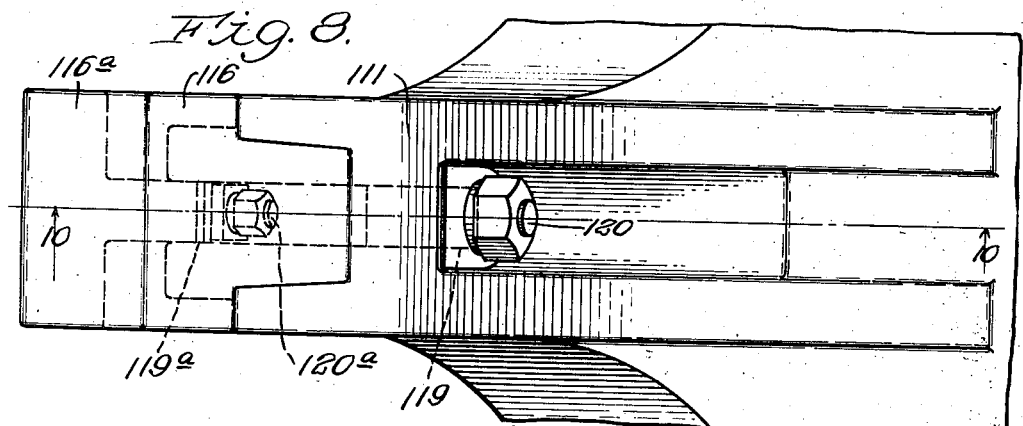
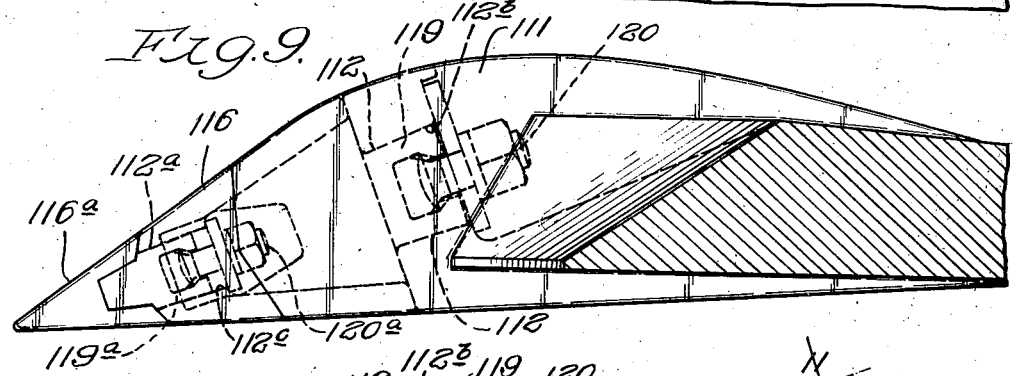
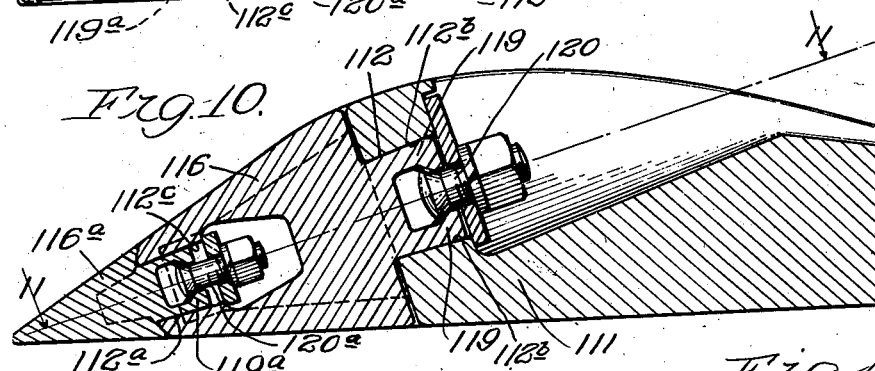
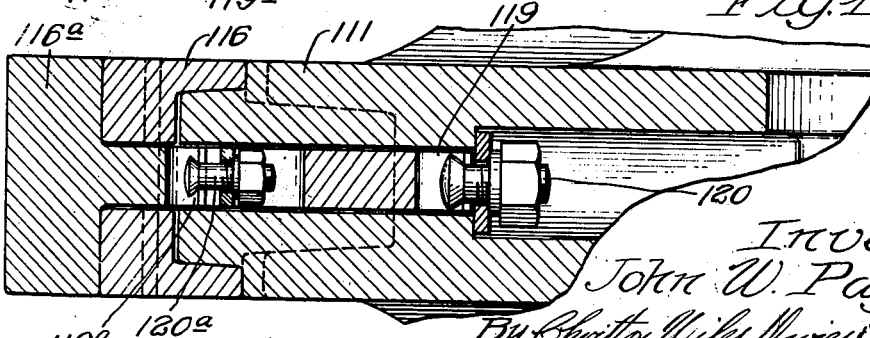
Inventor:
John W. Page,
By Christy, Wiles, Davies & Hirsch,
Attys.

Feb. 16, 1943. J. W. PAGE 2,311,463
BUCKET TOOTH
Filed Dec. 12, 1941 3 Sheets-Sheet 3
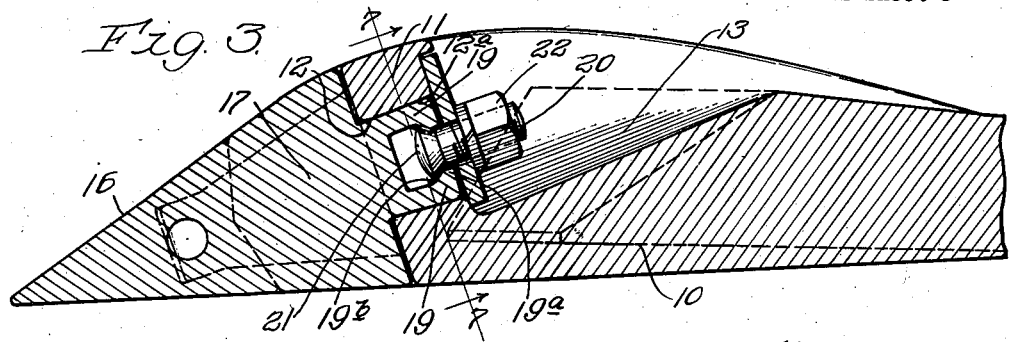
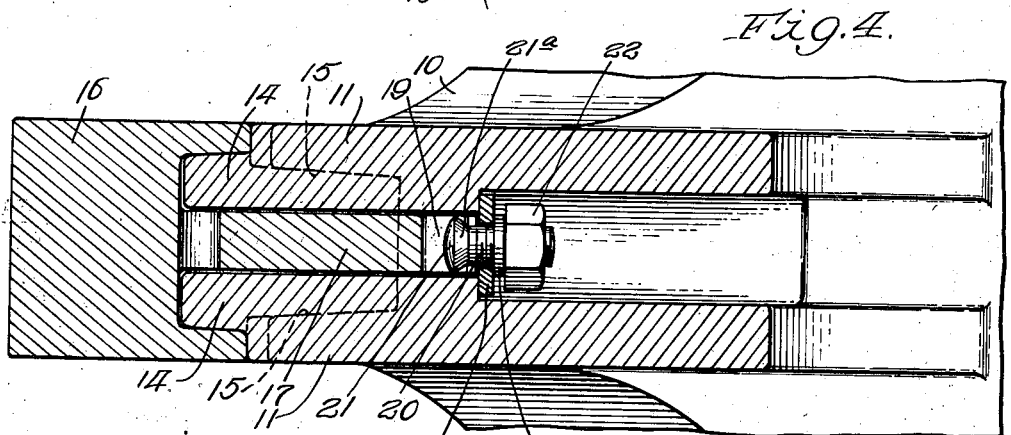
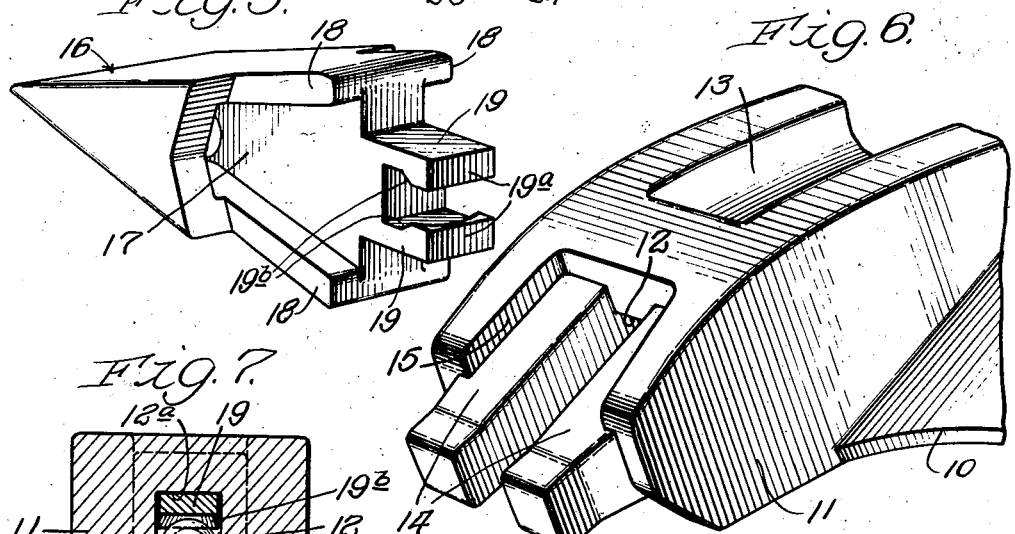
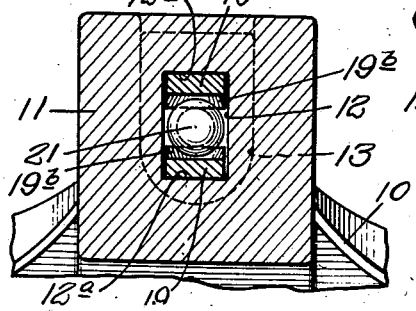

Patented Feb. 16, 1943

2,311,463

UNITED STATES PATENT OFFICE 2,311,463

BUCKET TOOTH

John W. Page, Chicago, Ill.

Application December 12, 1941, Serial No. 422,779

2 Claims. (Cl. 37—142)

This invention relates to improvements in bucket teeth and more especially a detachable tooth or tooth point for use in connection with excavating buckets, shovels and the like. The invention may be practiced, for example, in connection with a drag-line bucket, known in the art as a Page bucket.

Such a bucket is ordinarily provided with teeth on the forward edge of its bottom, such edge being frequently referred to as the lip or cutting edge of the bucket. Such teeth are subjected to hard usage with consequent wear and breakage necessitating frequent renewal or replacement of the teeth or points therefor.

The particular feature of my invention is the provision of simple rugged attaching means for a tooth or tooth point adapted to hold said tooth or tooth point firmly in position. In general, I provide a socket in the supporting member and the tooth or tooth point is provided with two spaced tongues adapted to enter this socket. Means are provided for simultaneously drawing these tongues into the socket and spreading the same so that they will be firmly seated therein.

I have here shown the invention as applied both to a removable tooth and a removable tooth point. The principle in either case is the same, however, as the complete tooth itself may be considered as a tooth point. Hereafter, therefore, I shall merely refer to a tooth point meaning to include thereby either a complete tooth which itself has a detachable point, or only the detachable point.

Other features and advantages of my invention will appear more fully as I proceed with my specification.

In those forms of device embodying the features of my invention as illustrated in the accompanying drawings: Fig. 1 is a top plan view; Fig. 2 is a view in side elevation; Fig. 3 is a view taken as indicated by the line 3 of Fig. 1; Fig. 4 is a view taken as indicated by the line 4 of Fig. 2; Fig. 5 is a view in perspective of the tooth removed; Fig. 6 is a view in perspective of the tooth support; Fig. 7 is a view taken as indicated by the line 7 of Fig. 3; Fig. 8 is a view similar to Fig. 1 showing a detachable tooth which also has a detachable tooth point; Fig. 9 is a view of the same in side elevation; Fig. 10 is a view taken as indicated by the line 10 of Fig. 8; and Fig. 11 is a view taken as indicated by the line 11 of Fig. 10.

As shown in the drawings, 10 indicates the lip or cutting edge of a bucket having a tooth support 11 here shown as formed integrally therewith.

12 indicates a socket in the tooth support 11 opening at the rear into a recess 13 in said support.

The support 11 is also provided with two spaced tapered lugs 14, 14 projecting forwardly from the front opening of the socket 12 and these lugs are somewhat recessed as indicated by 15, 15.

The detachable tooth is shown in perspective in Fig. 5 and is indicated in general by the numeral 16. This tooth is provided with a central vertical web 17 adapted to fit between the lugs 14, 14 on the support and is provided with upper and lower laterally projecting flanges 18, 18 adapted to lie in the recesses 15, 15.

The web 17 with the flanges 18, 18 is adapted to interfit with the lugs 14 and recesses 15 so as to give a tight snug fit and the faces may be slightly tapered as shown so that as the tooth is pulled up tightly on the support the tapered faces will cause a tight wedge fit.

The principal feature of this invention is the provision on the tooth of the two rearwardly projecting spaced tongues 19, 19 adapted to fit in the socket 12. The inner ends of these tongues are somewhat widened as indicated by 19a and their inner surfaces are provided with the beveled shoulders 19b.

20 indicates a bolt with a head 21 adapted to lie between the tongues 19, 19. The underside of this head is beveled as indicated by 21a and adapted to engage the beveled surfaces 19b on the tongues 19 so that when the bolt is drawn up the tooth will be drawn tightly in place and the tongues 19, 19 will be spread or separated to cause tight engagement with the upper and lower faces of the socket 12, thus clamping the tooth firmly in place.

The bolt 20 is provided with a nut 22 lying in the recess 13 and there is preferably provided a washer 23 and locknut 24 under the nut 22. When the nut 22 is tightened the bolt is drawn up to seat the tooth and separate the tongues 19, 19 as described above.

The construction shown in Figs. 8–11, inclusive, is substantially the same except that the tooth is provided with a detachable point 116a which is detachably fastened to the tooth 116 in the same manner as the tooth is fastened to the support 111. The tooth point 116a is provided with the spaced tongues 119a in the socket 112a. 120a indicates the bolt which operates in the same manner as the bolt 20 above described. As here shown, the tooth 116 is itself provided with two spaced tongues 119 lying in the socket 112 in the tooth support 111 and the bolt 120 is provided with a beveled head to separate the tongues 119 in said socket to hold the tooth on the tooth support 111.

It is to be noted that the sockets 12, 112 and 112a are somewhat undercut in their vertical dimensions as indicated by 12a, 112b and 112c, respectively. That is, the socket is larger in its vertical dimension at the rear of the opening than at the front so that when the tongues 19, 19; 119, 119; or 119a, 119a are spread by the action of the bolt they fill the larger rear portion of the opening like a dovetail to lock the tongues firmly in the socket. As here shown, the top and bottom faces of the socket are preferably tapered from the enlarged rear portion to the smaller front portion.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A tooth support having a socket therein; a detachable tooth point with two spaced tongues adapted to enter said socket, the inner ends of said tongues being thickened and provided with beveled shoulders on their inner faces; and wedging means adapted to engage said beveled shoulders to draw said tongues into said socket and spread the same to tightly engage the inner faces of said socket, said wedging means including a bolt carried by the support, said bolt having a head with beveled surfaces engaging the beveled shoulders of the tongues.

2. A tooth support having a socket therein; a detachable tooth point with two spaced tongues adapted to enter said socket, the inner ends of said tongues being thickened and provided with beveled shoulders on their inner faces; and wedging means adapted to engage said beveled shoulders to draw said tongues into said socket and spread the same to tightly engage the inner faces of said socket, said wedging means including a bolt carried by the support, said bolt having a head with a part engaging the beveled shoulders of the tongues.

JOHN W. PAGE.